(12) United States Patent
Numao

(10) Patent No.: US 6,377,688 B1
(45) Date of Patent: Apr. 23, 2002

(54) CRYPTOGRAPHIC COMMUNICATION METHOD AND SYSTEM

(75) Inventor: Masayuki Numao, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/001,874

(22) Filed: Dec. 31, 1997

(30) Foreign Application Priority Data

Apr. 28, 1997 (JP) .............................................. 9-110822

(51) Int. Cl.[7] .................................................. H04K 1/02
(52) U.S. Cl. .......................... 380/30; 713/200; 713/201
(58) Field of Search .......................... 380/30; 713/200, 713/201

(56) References Cited

U.S. PATENT DOCUMENTS

| | | | | |
|---|---|---|---|---|
| 5,682,430 A | * | 10/1997 | Killian et al. .................. | 380/30 |
| 5,748,735 A | * | 5/1998 | Ganesan ...................... | 380/21 |
| 5,812,671 A | * | 9/1998 | Ross, Jr. ....................... | 380/49 |
| 5,909,491 A | * | 6/1999 | Luo ............................. | 380/21 |
| 6,021,200 A | * | 2/2000 | Fischer ........................ | 380/23 |

OTHER PUBLICATIONS

Pfitzman, Breaking an Efficient Anonymous Channel, Advances in Cryptography, Eurocrypt '94, Springer–Verlag, 1995.*
Schneier, Applied Cryptography. John Wiley & Sons Inc. pp. 34–44, 185–187, 550, Oct. 1995.*

* cited by examiner

Primary Examiner—Thomas R. Peeso
(74) Attorney, Agent, or Firm—William A. Kinnaman, Jr.

(57) ABSTRACT

The object of the present invention is to provide a cryptographic communication system that maintains a high level of information security without a sender and a receiver being required to manage a secret key. According to the system of the present invention, a dedicated decryption server that has a secret key is employed in addition to a transmitter used by a sender and a receiver used by a recipient. While the presence of nonencrypted messages in the server is precluded, the server can decrypt an encrypted message and send the decrypted message to an authorized receiver.

11 Claims, 3 Drawing Sheets

CRYPTOGRAPHIC COMMUNICATION METHOD AND SYSTEM

BACKGROUND OF THE INVENTION

1. Field of the Invention

The present invention relates to a cryptographic communication system, and in particular to a cryptographic communication system for sending/receiving an encrypted message without the transmission of a plaintext message via a communication channel being required.

More specifically, the present invention pertains to a system wherein, while the presence of a nonencrypted message in a decryption server is precluded, the server decrypts an encrypted message and sends the decrypted message to an authorized receiver.

2. Description of the Related Art

A currently popular public key encryption system (a cryptographic communication system employing two types of keys, a public key and a secret/private key, for encryption and decryption) substantially inhibits the calculating of a decryption key, even though an encryption key can be read, based on the computational complexity of a unique factorization.

The public key cryptography system will now be briefly described. A key used when a third party sends information to a user himself is opened (i.e., made available) to the public. This key is called a public key, and is opened to the public by an official organization, etc., so that it is accessible to anyone. A decryption key for decrypting information that is encrypted using a public key and is assigned to a user is called a secret key or private key. A secret key is one that is known only by its owner. With this configuration, a user can prevent a leakage, to a third party, of information received across a network.

The RSA algorithm, which is one of the public-key cryptography, will now be explained. First, prime numbers a and b having an adequate number of digits are selected, and a product for them is calculated to create N, which is one of a pair of public keys:

$$N = a*b$$

The least common multiple LCM G of a−1 and b−1 is calculated:

$$G = LCM(a-1, b-1)$$

Next, another public key P, which is relatively prime with G, is selected (GCD: Greatest Common Divisor):

$$GCD(G,P) = 1$$

It is known that there are r and S that satisfy the following equation, and S is defined as a secret key:

$$G*r + P*S = 1$$

In this manner, the public keys (P, N) and the secret key S are created. (The values P and N may be regarded as constituting either a public key pair (i.e., plural keys) or, as is common in the art, as a single public key with components P and N. The distinction is purely one of terminology.)

Following this, encryption will now be described. When an encryption function involving public keys (P, N) is defined as $E_P(\ )$, it is represented as follows:

$$E_P(M) = M^P \bmod N,$$

wherein M is plaintext, whose length is less than N.

Referring to FIG. 1, when a sender SND sends a message M to a receiver RCV, first, the message M is raised to the Pth power and a remainder obtained by dividing the result by N is sent.

Finally, decryption using a secret key will be explained. When a secret key S is acquired, decryption function D( ) is defined as follows:

$$\begin{aligned}
D(C) &= E_S(C) \\
&= C^S \bmod N \\
&= (M^P \bmod N)^S \bmod N \\
&= M^{PS} \bmod N \\
&= M \bmod N \\
&= M
\end{aligned}$$

wherein encrypted text C is assumed to be $C = E_P(M)$.

Referring to FIG. 1, for decryption of an encrypted message sent by a sender 1 to a receiver 2, first, the received message is raised to the Sth power, and a remainder obtained by dividing the result by N is employed as a message M.

A detailed mathematical proof showing why an encrypted message is recovered to the message M by performing the above calculation is not related to the essence of the present invention, and no explanation for it will be given. The public encryption system provides very safe cryptographic communication between the sender 1 and the receiver 2.

However, in reality, it is complicated for the receiver 2 to himself create a pair of public keys (P, N) and a secret key S, and to open the former keys to the public and manage the latter.

Actually, one example of the above described environment is a case where a nationwide lottery is to be conducted on a network.

In addition to the other problems, when a lottery grouping related to the exchanges of money or tenders is conducted on a network, fairness must be taken into consideration. If decryption is performed only by a receiver, it could easily be imagined that to senders the trustworthiness of a receiver's system, the trustworthiness of a decryption method and the level of knowledge concerning encryption possessed by a user on the decryption side would be suspect.

If a sender mistakenly sends an encrypted message to a receiver, the receiver could illegally read the encrypted message and acquire knowledge of the contents.

SUMMARY OF THE PRESENT INVENTION

It is therefore one object of the present invention to provide a cryptographic communication system having a high level of information security even when for a specific recipient there is a plurality of senders.

It is another object of the present invention to provide a fair and secure lottery system.

It is an additional object of the present invention to provide a fair and secure public tender system.

It is a further object of the present invention to provide an encrypted message delivery method whereby a receiver can be verified to be an authorized receiver.

It is still another object of the present invention to provide an information exchange method whereby neither a sender nor a receiver have to manage a secret key.

It is a still further object of the present invention to provide an encryption transmission protocol for a sender, a receiver and a server.

It is a yet another object of the present invention to provide a method for decrypting message while having no knowledge of the contents of a plaintext message.

To achieve the above objects, according to the present invention, in addition to a transmitter used by a sender and a receiver used by a recipient, a server is employed that performs only the decryption of a message and that possesses a secret key. Further, while the presence of a nonencrypted messages in the server is precluded (i.e., the server is prevented from obtaining knowledge of the contents of a plaintext message), the server is responsible for the decryption of an encrypted message and the transmission of the decrypted message to an authorized receiver.

This system provides a protocol applicable to a three person group: a transmitter, a receiver and a server. Specifically:

1. The server creates a paired secret key and public key using a public key system, and opens the latter keys to the public.
2. The transmitter encrypts information (a message) using the public key and sends the encrypted information to the receiver.
3. The receiver adds a secret random number to the encrypted information to provide additional encryption for the information, and sends the resultant information to the server.
4. The server decrypts the received information using its secret key, and returns the decrypted information to the receiver.
5. The receiver multiplies the information by the inverse element of the secret random number to recover the original information, and reads it.

Using this protocol, a secure and fair encrypted message delivery system, lottery system and public tender system can be provided. In addition, according to this protocol, no plaintext messages are not sent on the line that connects between the transmitter, the receiver and the server. The management of secret material is no longer required of the sender and the receiver. Further, no plaintext message is recovered during the processing performed by the server when decrypting a message. Therefore, the server can provide a decryption service while having no knowledge of the contents of an encrypted message.

DESCRIPTION OF THE PREFERRED EMBODIMENT

Figure 1:
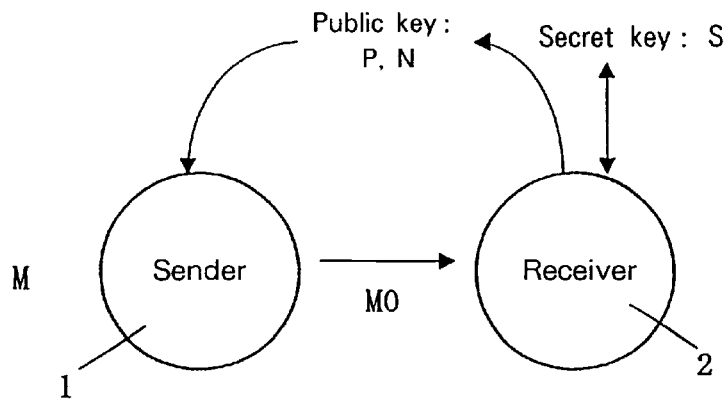
FIG. 1 is a diagram illustrating the outline of a conventional public key encryption system.
Figure 2:
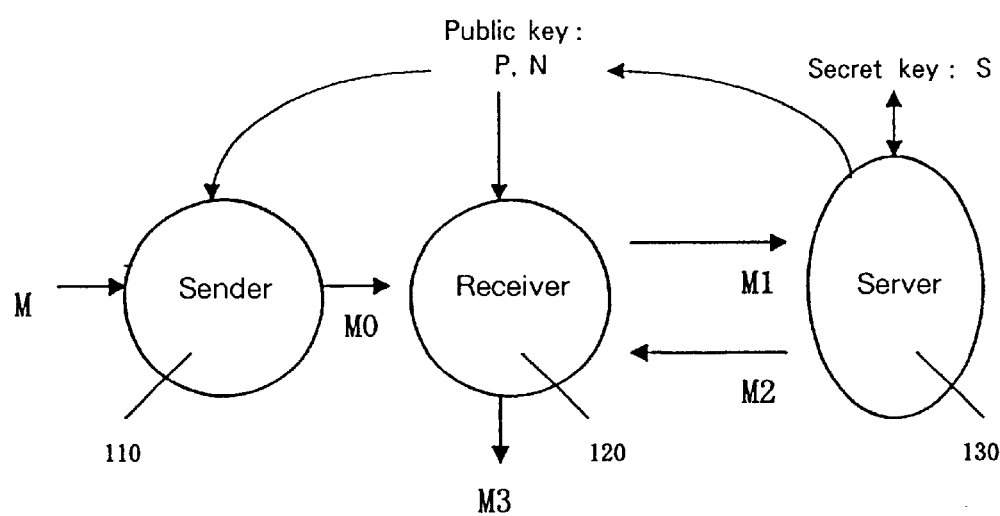
FIG. 2 is a schematic diagram illustrating a cryptographic communication system according to the present invention.

FIG. 2 shows the outline of a cryptographic communication system according to the present invention. A server 130 generates a key set comprising a secret key S and public keys (P, N) using the public key method, and opens the latter keys to the public. A sender 110 encrypts a message M using the public key and sends encrypted message M0 to a receiver 120. The receiver 120 adds a random number $X_R$, known only to the receiver, to the received message M0 to encrypt the message M0. This encryption is sometimes called blinding, and involves the multiplication of M0 by $E_P(X_R)$. The resultant message is sent to a server 130. The server 130 decrypts the received message using its secret key S and returns the decrypted message to the receiver 120. The receiver 120 then multiples the message by the reciprocal of the secret random number $X_R$ (the inverse element of random number $X_R$ modulo N), so that the receiver 120 can read the message M sent by the sender 110.

Figure 3:
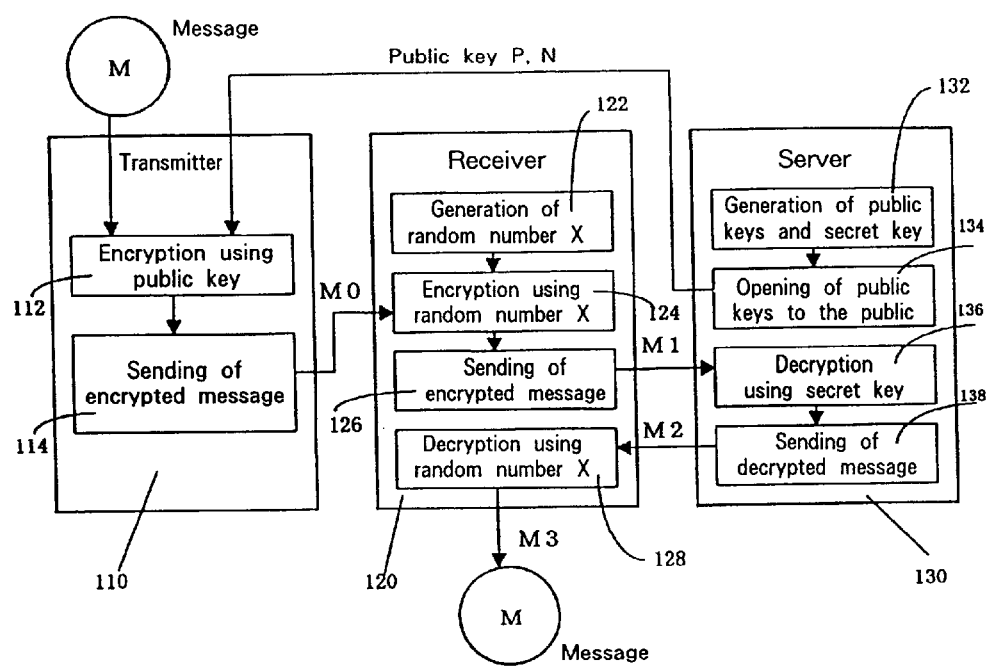
FIG. 3 is a block diagram illustrating the cryptographic communication system according to the present invention.

FIG. 3 is a block diagram illustrating a cryptographic communication system according to the present invention. In a transmitter 110, an encryption means 112 in FIG. 3 encrypts a message M using public keys P and N, which are created by a server 130. Then, an encrypted message transmission means 114 sends encrypted message M0 to a receiver 120.

In the receiver 120, random number generation means 122 generates a random number $X_R$ that is used by encryption means 124 to provide additional encryption for the message M0, which is received from the transmitter 110.

Following the use of the random number $X_R$, which can be either a prime number or a composite number constituted by the product of a plurality of numbers, encrypted message transmission means 126 sends encrypted message M1 to the server 130. At the server 130, decryption means 136 uses a secret key to decrypt the message M1 and obtain message M2, which decrypted message transmission means 138 then sends to the receiver 120. Thereafter, decryption means 128 uses the random number $X_R$ to decrypt the message M2 and obtains a message M3. By using the RSA relational equation, the value obtained for the message M3 is the same as that of the message M.

In the dedicated, decryption server 130, first, key generation means 132 generates a pair of public keys P and N and a secret key S. Then, key opening means 134 functions to open to the public only the public keys P and N. When a public key is opened to the public, the public key is distributed to and made available at official organizations, such as libraries and other public agencies, or is published at locations on the Internet, etc., that can be freely accessed, so that the key is available to and can be used by anyone. Thus, a sender at a transmitter 110 who desires to send a message M to a recipient at a receiver 120 can easily acquire public keys P and N and can initiate cryptographic communication using these keys. Subsequently, at the server 130, decryption means 136 uses a secret key to decrypt an encrypted message M1 sent from receiver 120, and a decrypted message M2 is sent to the receiver 120 by decrypted message transmission means 138.

It should be noted that at no time is there a plaintext message M, i.e., a nonencrypted message M, present in the decryption server 130. And while currently there is always some functional element associated with a decryption operation where deterioration of information security occurs, there is no such security hole in the thus arranged server of the present invention.

An explanation will now be given for message encryption processing (protocol) when the RSA encryption relational equation, which is one of the public key encryption methods, is applied for the present invention. First, let us assume that the relationship between encryption and decryption is as represented by the following function:

$E_P(M)$: encryption of message M using public keys P and N $D_S(M)$: decryption of message M using secret key S In FIG. 3, messages M0, M1, M2 and M3 are represented as:

Encryption of message M by sender: $M0=E_P(M)$

Encryption of message by receiver: $M1=E_P(X_R)*M0$

Decryption of server: $M2=D_S(M1)$

Changing message to plaintext by receiver: $M3=M2*(X_R-1)$

Since $E_P(M) = M^P \bmod N$ in the RSA encryption relational equation, $$M1 = E_P(X_R) * M0 \bmod N$$
$$= (X_R^P \bmod N)(M^P \bmod N)$$
$$= (X_R * M)^P \bmod N.$$

Thus, $$M2 = D_S(M1)$$
$$= (X_R * M)^{PS} \bmod N$$
$$= X_R * M.$$

And therefore:

$$M3 = M2 * (X_R^{-1}) \bmod N$$
$$= M.$$

At this time it should be noted that $X_R$ and M are smaller than N.

Cryptographic communication processing according to the present invention, which is performed in time series between a transmitter, a receiver and a server, will now be described while referring to FIG. 4.

Figure 4:
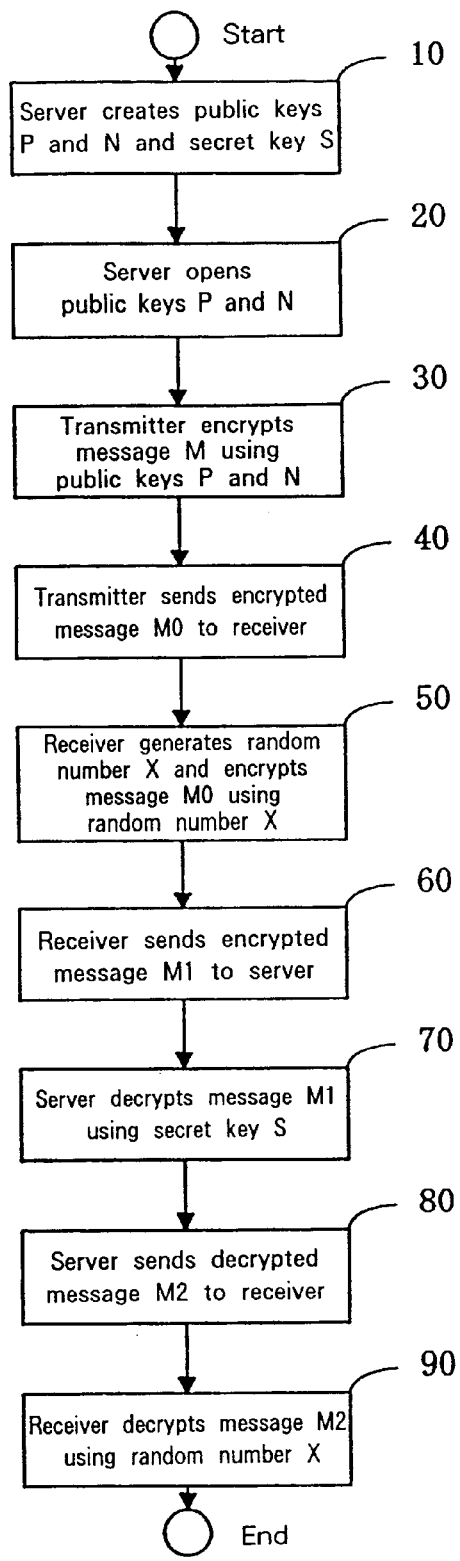
FIG. 4 is a flowchart for a cryptographic communication method according to the present invention.

First, at step 10 in FIG. 4 the server 130 employs the public key method to create a set of keys comprising a secret key S and public keys P and N, and at step 20 the latter keys are opened to the public. At step 30 the transmitter 110 encrypts a message M using the public keys and at step 40 sends an encrypted message M0 to the receiver 120. At step 50 the receiver 120 adds a specified random number $X_R$ to the encrypted message M0 to encrypt the message M0. This encryption is sometimes called blinding, and involves the multiplication of M0 by $E_P(X_R)$. At step 60 the encrypted message M1 is sent to the server 130. At step 70 the server 130 decrypts the received message M1 using its secret key S, and at step 80 returns the decrypted message M2 to the receiver 120. At step 90, the receiver 120 multiplies the message M2 by the reciprocal of the secret random number $X_R$, i.e., the inverse element of the random number $X_R$ modulo N. As a result, the message M sent from the transmitter 110 can be read.

Another example cryptographic communication system is a lottery system. The procedures for the control of this system are those contained in the protocol for three locations described above. The system is implemented by employing the following protocol:

1. A server generates a pair of public keys and a secret key and opens the public keys to the public.
2. An applicant encrypts his or her name (actually, an identifier assigned to the transmitter of the applicant) using a public key provided by the server, and sends the encrypted name to a receiver.
3. The recipient (actually the recipient's receiver) provides additional encryption for the encrypted name using a random number X and sends the encrypted name to a lottery server.
4. The lottery server selects one of the encrypted names and decrypts it, and returns the decrypted name to the recipient.
5. The recipient multiplies the selected name by the reciprocal $X^{-1}$ of the random number X to obtain the name of a winner (the identifier assigned to the transmitter).

An additional example cryptographic communication system is an open bid system. This system is implemented by employing the following protocol. It is important that a bidding management server have a function for opening a bidding price only after the due date passed.

1. The bidding management server generates a pair of public keys and a secret key, and opens the public keys to the public.
2. Responders encrypt bidding prices (actually, the transmitter of the responder) using the public key provided by the bidding management server, and send the encrypted prices to a requester.
3. The requester (actually, the transmitter of the requester) further encrypts the encrypted prices using a random number X and sends the encrypted prices to the bidding management server.
4. When the responder opening time comes, the bidding management server decrypts all the encrypted prices and returns the decrypted prices to the requester.
5. The requester (actually, the receiver of the requester) multiples the reciprocal $X^{-1}$ of the random number X by the received prices to obtain the bidding prices offered by the responders.

A further example cryptographic communication system is an encrypted message delivery service system. This system is implemented by employing the following protocol.

1. A server generates multiple pairs of public keys and a secret key and opens the public keys to the public.
2. The server registers a sender in advance, and issues a certificate for encryption service. Included as parts of this certificate are a sender ID, a recipient ID and a valid period, and also a public key for encryption. A unique public key is selected from multiple key pairs and assigned to the sender.
3. The sender (actually, the transmitter of the sender) encrypts a message using the public key provided by the server, and sends the encrypted message and the certificate to a receiver.
4. The recipient (actually, the receiver of the recipient) encrypts the received message using a random number X, adds a signature to the encrypted message, and sends it with the certificate to the server.
5. The server opens the signature to verify the recipient is the one described in the certificate.

After the server has verified the recipient is authorized, the server decrypts the message and returns the decrypted message to the recipient. In this manner, the recipient can decrypt only the message that is legally received, so that a more secure encrypted message delivery service can be provided.

By employment of the protocol of the present invention, no plaintext message is sent across the line that connects the transmitter, the receiver and the server. In addition, the sender and the receiver can exchange encrypted messages without having to manage a secret key. Further, plaintext does not appear even during the decryption of the message at the server, and it is possible for a server to provide message decryption service without knowing the contents of the message.

What is claimed is:

1. A cryptographic communication system having a transmitter, a receiver and a server, wherein said system being characterized in that:
   (1) said server has means for creating a pair of public keys (P, N) and a secret key S, and means for opening said public keys to the public;
   (2) said transmitter has means for encrypting a message M using said public keys (P, N) as a message M0, and means for sending said message M0 to said receiver;
   (3) said receiver has means for encrypting said message M0 using a specified random number $X_R$ as a message M1, and means for sending said message M1 to said server;
   (4) said server has means for decrypting said message M1 using said secret key S as a message M2, and means for sending said message M2 to said receiver; and (5) said receiver has means for decrypting said message M2 using said specified random number $X_R$ as a message M3.

2. A lottery system using cryptographic communication having a plurality of transmitters, a receiver and a server, said system being characterized in that:
   (1) said server has means for creating a pair of public keys (P, N) and a secret key S, and means for opening said public keys to the public;
   (2) said plurality of transmitters each have means for encrypting an identifier M assigned for each transmitter using said public keys (P, N) as an identifier M0, and means for sending said identifier M0 to said receiver;
   (3) said receiver has means for encrypting said identifiers M0 using a specified random number $X_R$ as a plurality of identifiers M1, and mean for sending said identifiers M1 to said server;
   (4) said server has means for selecting one of said identifiers M1 and decrypting a selected identifier M1 using said secret key S as an identifier M2, and means for sending said identifier M2 to said receiver; and
   (5) said receiver has means for decrypting said identifier M2 using said specified random number $X_R$ as an elected identifier M3.

3. A public tender system having a plurality of transmitters, a receiver and a server, said system being characterized in that:
   (1) said server has means for creating a pair of public keys (P, N) and a secret key S, and means for opening said public keys to the public;
   (2) said plurality of transmitters each have means for encrypting a contract price M assigned for each transmitter using said public keys (P, N) as a contract price M0, and means for sending said contract price M0 to said receiver;
   (3) said receiver has means for encrypting said contract prices M0 using a specified random number $X_R$ as a plurality of contract prices M1, and means for sending said contract prices M1 to said server;
   (4) said server has means for, as soon as it is time for opening, decrypting all of said contract prices M1 using said secret key S as contract prices M2, and means for sending said contract prices M2 to said receiver; and
   (5) said receiver has means for decrypting said contract prices M2 using said specified random number $X_R$ as a plurality of contract prices M3.

4. An encrypted message delivery service system having a transmitter, a receiver and a server, said system being characterized in that:
   (1) said server has means for creating pairs of multiple public keys and a secret key S, and means for opening said public keys to the public;
   (2) said server has means for registering said transmitter at said server, and means for issuing in advance a certificate that includes a transmitter ID, a receiver ID and public keys (P, N) uniquely selected from multiple pairs of said public keys and assigned to said transmitter;
   (3) said transmitter has means for encrypting a message M using said public keys (P, N) as a message M0, and means for sending said message M0 with said certificate to said receiver;
   (4) said receiver has means for encrypting said message M0 using a specified random number $X_R$ as a message M1, means for adding a signature to said message M1, and means for sending said message M1 with said certificate to said server;
   (5) said server has means for opening said signature to verify that said receiver is an authorized receiver described in said certificate, and means for, when said receiver is authorized as an authorized receiver, decrypting said message M1 using said secret key S as a message M2 and sending said message M2 to said receiver; and
   (6) said receiver has means for decrypting said message M2 using said specified random number $X_R$ as a message M3.

5. A cryptographic communication method between a transmitter, a receiver and a server, said method comprising the steps of:
   (1) said server creating a pair of public keys (P, N) and a secret key S, and opening said public keys to the public;
   (2) said transmitter encrypting a message M using said public keys (P, N) as a message M0, and sending said message M0 to said receiver;
   (3) said receiver encrypting said message M0 using a specified random number $X_R$ as a message M1, and sending said message M1 to said server;
   (4) said server decrypting said message M1 using said secret key S as a message M2, and sending said message M2 to said receiver; and
   (5) said receiver decrypting said message M2 using said specified random number $X_R$ as a message M3.

6. The system according to one of claims 1 through 4, wherein RSA encryption relational equations are established between said public keys (P, N) and said secret key S and wherein said M0, M1, M2 and M3 are represented as:

$$M0 = M^P \bmod N$$
$$M1 = (X_R^P \bmod N) * M0 \bmod N$$
$$= (X_R * M)^P \bmod N$$
$$M2 = (M1)^{PS} \bmod N$$
$$= (X_R * M)^{PS} \bmod N$$
$$= X_R * M$$
$$M3 = M2 * (X_R^{-1}) \bmod N$$
$$= M.$$

7. The system according to claim 6, wherein said specified random number $X_R$ is a prime number.

8. The system according to claim 6, wherein said specified random number $X_R$ is a composite number composed of a product of a plurality of numbers.

9. The method according to claim 5, wherein RSA encryption relational equations are established between said public keys (P, N) and said secret key S and wherein said M0, M1, M2 and M3 are represented as:

$$M0 = M^P \bmod N$$
$$M1 = (X_R^P \bmod N) * M0 \bmod N$$
$$= (X_R * M)^P \bmod N$$
$$M2 = (M1)^{PS} \bmod N$$
$$= (X_R * M)^{PS} \bmod N$$
$$= X_R * M$$
$$M3 = M2 * (X_R^{-1}) \bmod N$$
$$= M.$$

10. The method according to claim 5, wherein said specified random number $X_R$ is a prime number.

11. The method according to claim 5, wherein said specified random number $X_R$ is a composite number composed of a product of a plurality of numbers.

* * * * *